United States Patent Office 3,263,635
Patented August 2, 1966

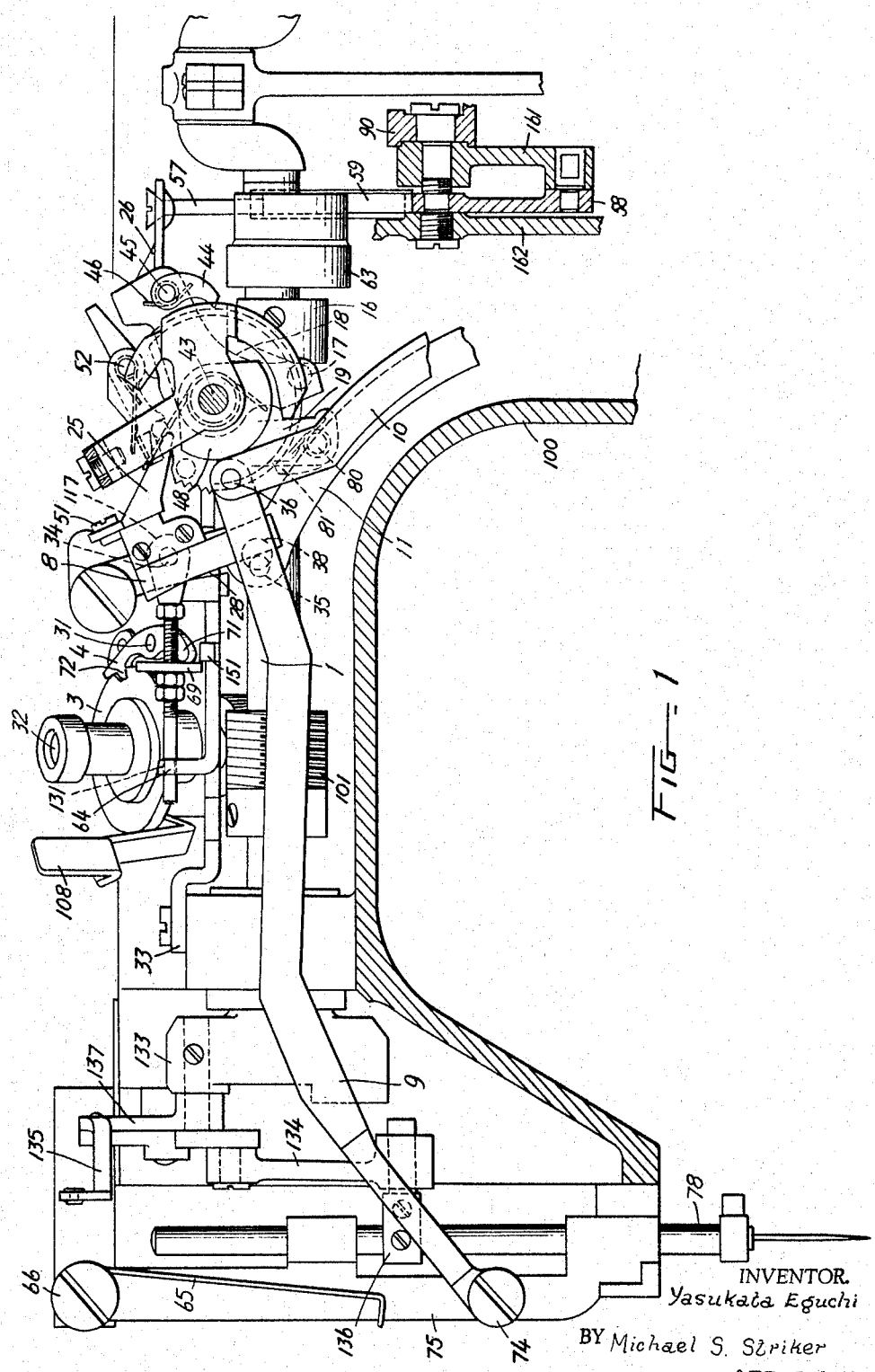

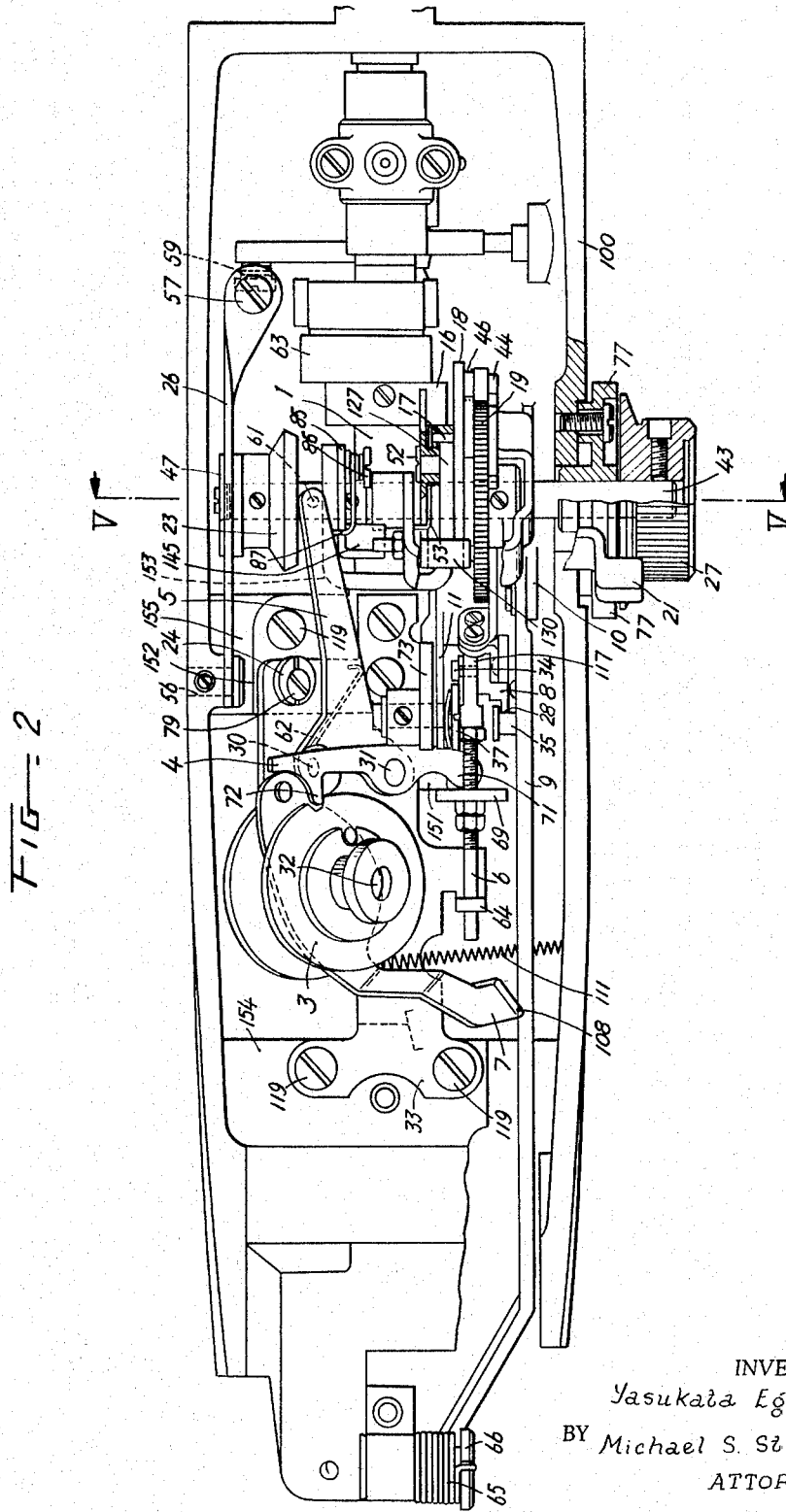

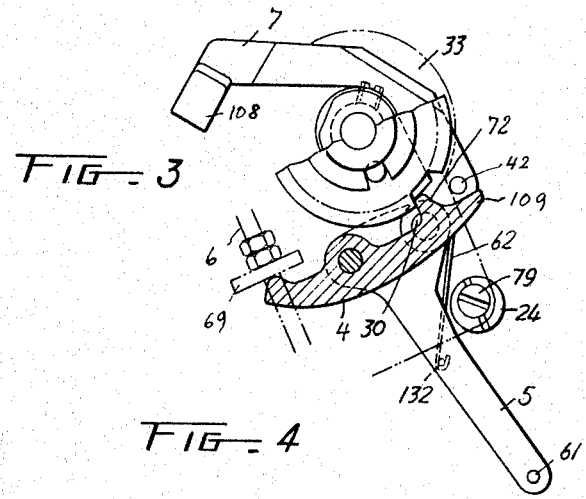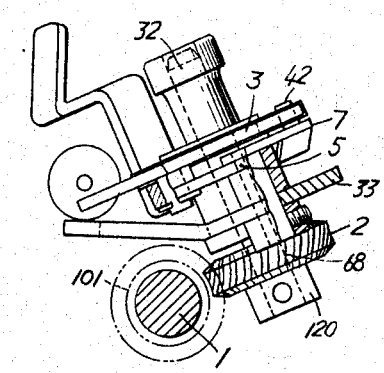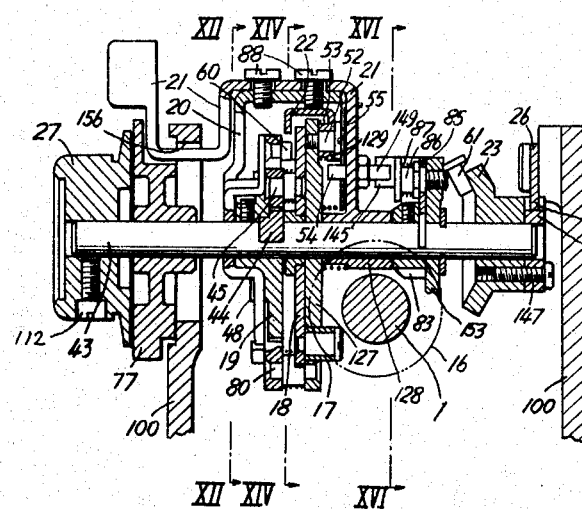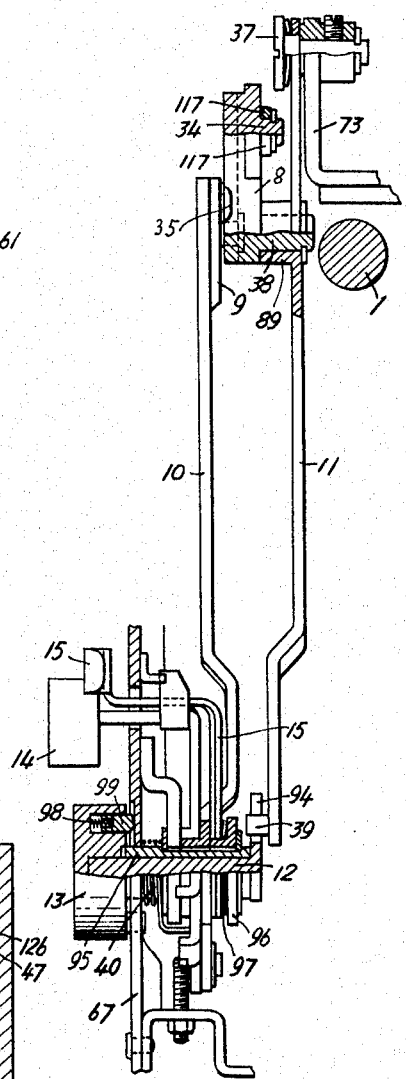

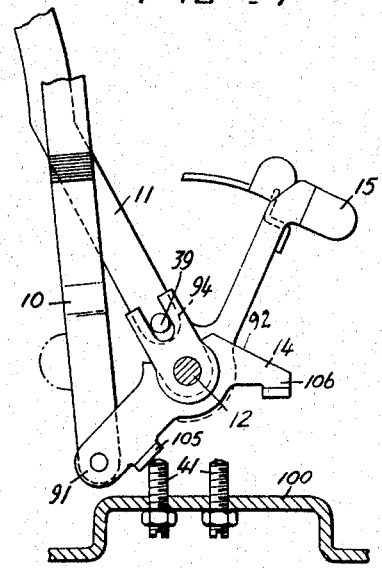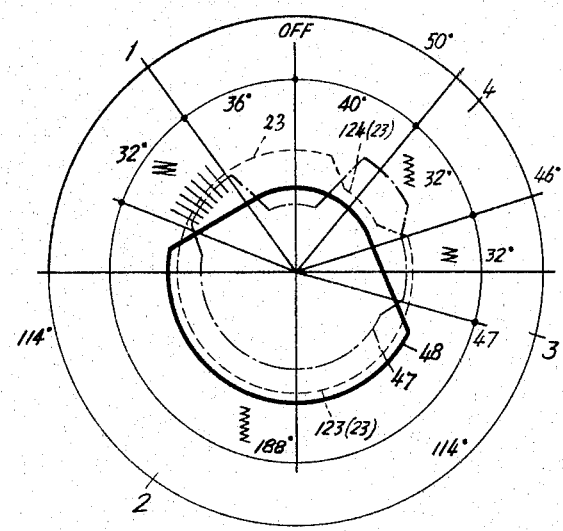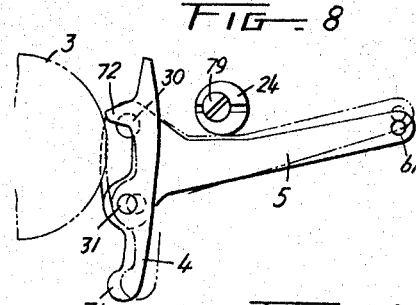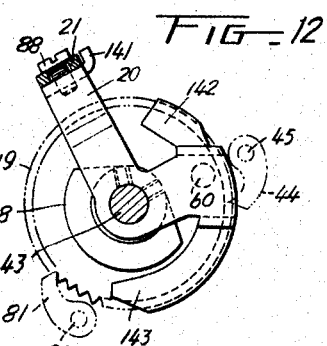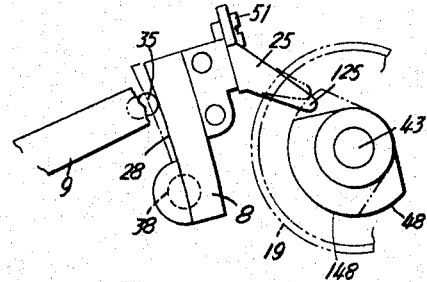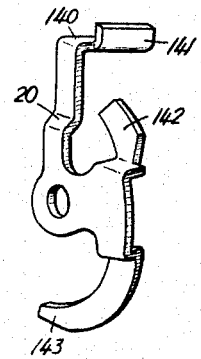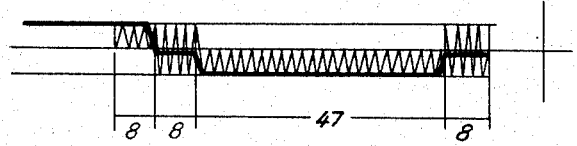

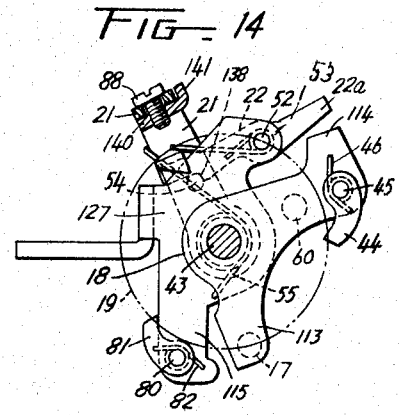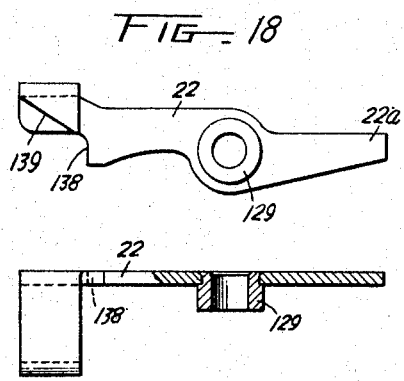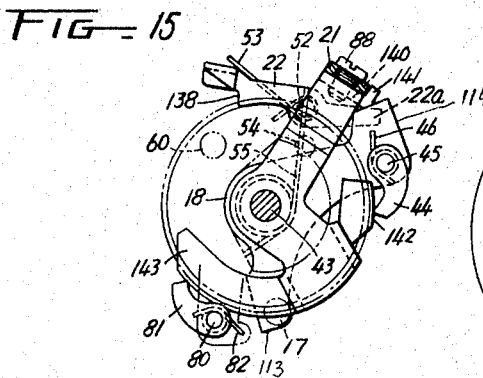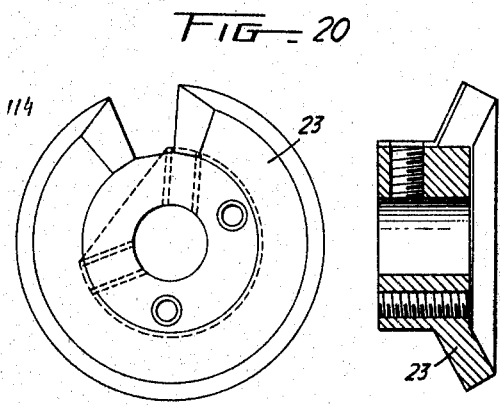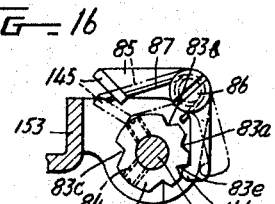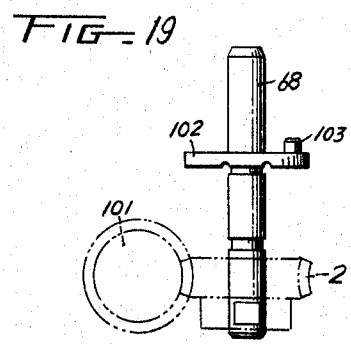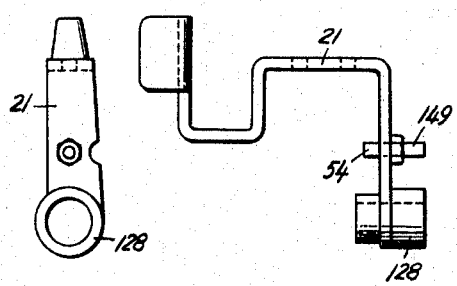

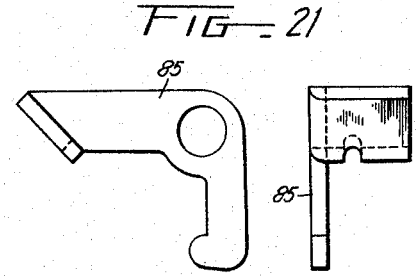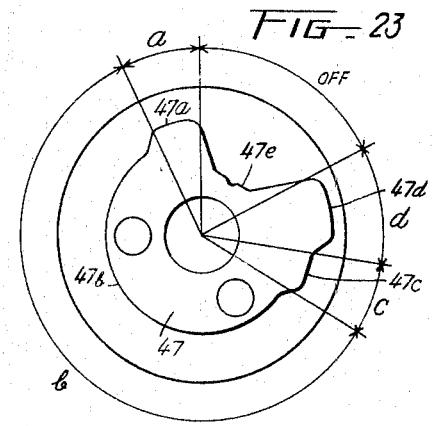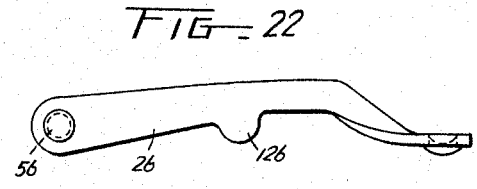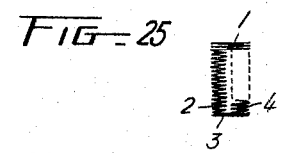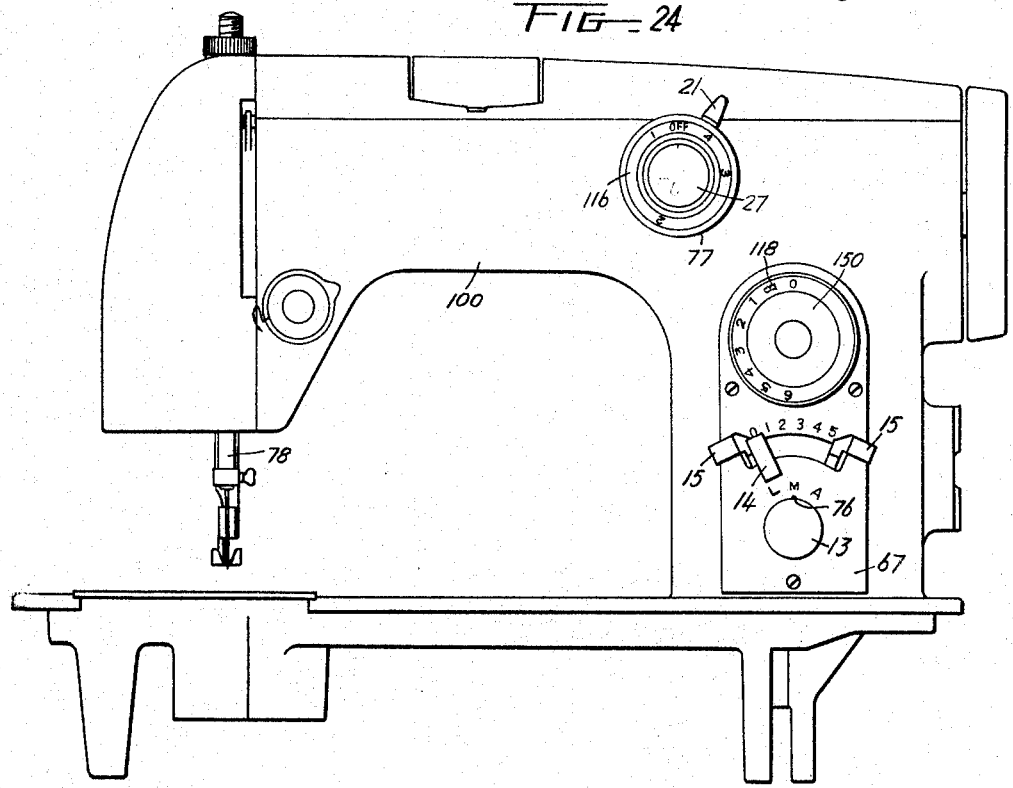

3,263,635
BUTTONHOLE STITCHING APPARATUS
Yasukata Eguchi, Tokyo, Japan, assignor to Janome Sewing Machine Co., Ltd., Tokyo, Japan
Filed Apr. 17, 1963, Ser. No. 273,612
Claims priority, application Japan, Apr. 21, 1962, 37/16,396
8 Claims. (Cl. 112—158)

The present invention relates to a buttonhole stitching apparatus for a sewing machine, and more particularly to a buttonhole stitching apparatus which is automatically operated so as to control the needle bar assembly of the sewing machine so that bar tack stitches are made at the end of the buttonhole, and small stitches are made along the sides of the buttonhole in the proper sequence.

It is the main object of the present invention to provide an automatically operating buttonhole stitching apparatus for a zig-zag sewing machine.

Another object of the present invention is to drive the buttonhole stitching device of a sewing machine from the main drive shaft of the sewing machine so that the buttonhole stitching device is automatically set to different positions.

Another object of the present invention is to drive the buttonhole stitching device from the main drive shaft of the machine in an intermittent stepwise movement.

Another object of the invention is to provide means for disconnecting the drive of the buttonhole stitching device so that the same may be manually controlled.

Another object of the invention is to provide means for disconnecting the automatic drive from the buttonhole stitching device when it is desired to maintain the buttonhole stitching device in a selected position.

Another object of the invention is to control, in addition to the buttonhole stitching device, also the feed adjusting device by the automatic drive means so that the feeding speed of the fabric is varied in accordance with the type of stitching required at the buttonhole.

Another object of the invention is to automatically set a sewing machine to a condition in which bar tack stitches of greater amplitude are made at a minimum feeding speed, and then to automatically shift the sewing machine to a position in which small stitches are made at a selected feeding speed along the side of a buttonhole.

Another object of the invention is to automatically reverse the feeding means when small stitches on the other side of the buttonhole are necessary for completing the buttonhole stitching.

With these objects in view, the present invention relates to a buttonhole stitching apparatus for a zig-zag sewing machine. One embodiment of the invention comprises needle means which are movable in a lateral zig-zag movement, a buttonhole stitching device for controlling the needle means to make zig-zag stitches and having a plurality of positions in which zig-zag stitches of different amplitude are made by the needle means, and drive means connected to the buttonhole stitching device for moving the same between the positions thereof so that the needle means makes zig-zag stitches of different amplitude successively at the ends and sides, respectively, of a buttonhole.

In the preferred embodiment of the invention feed adjusting means having a plurality of positions are provided for varying the feed at which a fabric is fed to the needle means, and a drive means automatically shifts not only the buttonhole stitching device, but also the feed adjusting means between the respective operative positions thereof so that the needle means makes bar tack stitches at a minimum feeding speed, and zig-zag stitches on the sides of the buttonhole at a selected feeding speed.

Preferably, the buttonhole stitching device and the feed adjusting means are controlled by control cams secured to a control shaft which is intermittently driven from the main drive shaft of the machine.

The oscillatory movement of the needle means is derived from a pattern or stitch cam which is driven at a reduced speed from the main drive shaft. A double-armed cam follower cooperates with the pattern cam and is connected by transmission means including a rocking means to the needle bar assembly. For buttonhole stitching purposes, the pattern cam has a regular pattern to produce uniform zig-zag stitches. The cam follower is mounted on a carrier which can be shifted by a cam on the control shaft to displace the axis of the double-armed cam follower whereby the stitch position is changed, and when the oscillatory movement of the rocking means is simultaneously limited by another cam on the control shaft, small zig-zag stitches are made by the needle means along the side of the buttonhole.

The intermittent drive which connects the main drive shaft of the sewing machine with the control cam shaft by which the buttonhole stitching device and the feed adjusting means are controlled, includes pawl and ratchet means, and manually operated means by which the pawls can be disconnected from the ratchet means whereby the automatic drive is disconnected at the will of the operator.

In this condition, the control shaft may be manually turned, and a control knob is provided thereon for this purpose. By operation of a shaft lever, the apparatus can be again set to automatic operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal sectional view illustrating a zig-zag sewing machine provided with the buttonhole stitching apparatus according to the invention;

FIG. 2 is a plan view of the machine illustrated in FIG. 1, with a top cover removed;

FIG. 3 is a fragmentary plan view illustrating the mounting of a pattern cam, and its relation to a cam follower, and its carrier;

FIG. 4 is a fragmentary side view of the detail shown in FIG. 3;

FIG. 5 is a sectional view taken on line V—V in FIG. 2, and illustrating the buttonhole stitching apparatus according to the present invention;

FIG. 6 is a side view, partially in section, of a detail of a device for adjusting the stitch amplitude, and the field position of the needle by a manual operation;

FIG. 7 is a fragmentary front view, partially in section, illustrating a detail of FIG. 6;

FIG. 8 is a plan view illustrating a cam follower and its carrier;

FIG. 9 is a front view illustrating a part of a transmission from the pattern cam to the needle means, and a cam for limiting the oscillation of the needle means when small stitches are required on the sides of a buttonhole;

FIG. 10 is a diagram illustrating successive bar tack stitches and small stitches automatically made along a buttonhole;

FIG. 11 is a diagram illustrating the operative positions of the control cams which control the buttonhole stitching device and the feed adjusting device;

FIG. 12 is a fragmentary sectional view taken on line XII—XII in FIG. 5;

FIG. 13 is a perspective view illustrating a part of the buttonhole stitching device;

FIG. 14 is a fragmentary sectional view taken on line XIV—XIV in FIG. 5;

FIG. 15 is a fragmentary sectional view taken on line XIV—XIV and illustrating the device in another operational position in which manual control is possible;

FIG. 16 is a fragmentary sectional view taken on line XVI—XVI in FIG. 5;

FIG. 17 includes a side view and a front view of a shifting lever used in the apparatus shown in FIG. 5;

FIG. 18 is a side view and a plan view, partially in section, of a shifting arm used in the apparatus of FIG. 5;

FIG. 19 is a front view of the shaft on which the pattern cam is mounted;

FIG. 20 includes a front view and a sectional view of a control cam used in the apparatus of FIG. 5 for shifting the cam follower carrier;

FIG. 21 includes a side view and a front view of a pawl for arresting the control shaft of the apparatus in a plurality of positions;

FIG. 22 is a front view of a follower lever by which the feed adjusting means are controlled;

FIG. 23 is a side view of a control cam for controlling the feed adjusting means;

FIG. 24 is a front view of a sewing machine provided with the apparatus of the invention and illustrating the indicating means of the apparatus; and FIG. 25 is a plan view illustrating buttonhole stitching made under the control of the apparatus of the invention.

A main drive shaft 1 is mounted in the machine frame 100, and driven by conventional drive motor means. A worm gear 101 is secured to main drive shaft 1 and meshes with a worm gear 2 secured by a bearing member 120 to a cam shaft 68, see FIG. 4. As best seen in FIG. 19, a cam holder plate 102 is carried by shaft 68 and has a coupling pin 103 which is adapted to fit into a corresponding bore 104 in a pattern cam 3. Pattern cam 3 has a holding part 32 which is manually gripped to remove cam 3 from shaft 68. In this manner, different pattern cams 3 may be placed on shaft 68 and coupled to the same by coupling pin 103.

Cam 3 cooperates with a cam follower 4, best seen in FIGS. 3 and 8, which is mounted for angular movement on a pivot 31 secured to a movable carrier 5. Carrier 5 is mounted on a support plate 107 turnable about a pivot 30, and has at one end a cam follower 61 cooperating with an adjusting cam 23, as best seen in FIGS. 2 and 5. A spring 62 is wound about pivot pin 30 and has one end secured to the machine frame 100, and another end fixed to a pin 132 on carrier 5 as best seen in FIG. 3.

Cam follower 4 has a follower portion 72 cooperating with pattern cam 3, and a control portion 71 cooperating with a flange 69 fixed on a motion-transmitting rod 6 as best seen in FIGS. 1 and 2. Rod 6 is guided for longitudinal movement in a bore 131 in an angular portion of a supporting bracket 33 which is secured to the frame 100. When cam follower 4 is oscillated by a pattern cam 3, rod 6 is reciprocated in longitudinal direction. The end of rod 6 is connected to a rocking member 8 by a pivot pin 34, as best seen in FIG. 2.

Rocking member 8 is angularly oscillatable about a pivot pin 38, and has a guide face 28 engaged by a follower pin 35 on a transmission member 9 which is connected by a pivot screw 74 to the needle bar support 75, as shown in FIG. 1. A spring 65 acts on needle bar support 75 to urge the needle bar to turn in counterclockwise direction as viewed in FIG. 1 about pivot 66 so that resilient pressure is exerted on rocking member 8, and through rod 6 and flange 69 on cam follower 4 so that the cam follower portion 72 is urged toward pattern cam 3.

Drive shaft 1 drives a rotary member 133 which operates through a crank mechanism 134, 137, 135 a member 136 which is secured to the needle bar 78 so that the same is raised and lowered with the needle to perform stitching operations. When the needle bar assembly 75 is oscillated by transmission member 9 under the control of pattern cam 3, zig-zag stitches will be produced.

A link 10 is connected by pivot pin 36 to the end of transmission member 9 and has a lower end connected by a pivot pin to the arm 91 of an amplitude adjusting lever 14 which, as best seen in FIG. 7, is mounted for turning movement on a shaft 12 of an adjusting knob 13. Lever 14 has a second arm 92, and arms 91 and 92 are provided with projections 105 and 106 cooperating with stop screws 41 secured to frame 100. Lever 14 can be shifted between six positions indicated by the indicia 0 to 5 appearing on the indicia plate 67, as best seen in FIG. 24. When lever 14 is turned between the indicated positions, link 10 is shifted and angularly displaces transmission member 9 so that follower slide pin 35 moves along the slide surface 28 of rocking member 8. In this manner, the effective radius of rocking member 8 is varied, and consequently, the amplitude of the zig-zag stitches produced by the needle bar assembly is varied.

As explained above, rocking member 8 is driven from pattern cam 3 through cam follower 4 and motion transmitting means 6, 69, 34.

Another link 11 is mounted for pivotal movement on a pivot means 37 which is secured to a bracket 73 on the frame of the machine, as best seen in FIG. 6. The rocking member 8 includes a pivot portion 38 which is mounted for turning movement in a bearing bushing 89 provided on link 11.

The lower end of link 11 has a projecting pin 39 which is embraced by a pair of prongs of an arm 94 carried by shaft 12 of adjusting knob 13, as best seen in FIGS. 6 and 7. A spring 40 surrounds bushing 95 on shaft portion 12, and has one end secured to arm 91 of amplitude adjusting lever 14, and the other end secured to the machine frame 100 to urge the amplitude adjusting lever 14 to the zero position. A restricting lever 16 is mounted on bushing 95 and held in position by a washer 97 and a flanged member 96 so as to be freely turnable.

A pointer arrow 76 is provided on the field adjusting knob 13, and cooperates with indicia L, M and R on the indicia plate 67 which is mounted on the frame 100, as best seen in FIG. 24. When knob 13 is in the center position pointing to the indicia M, a seam will be made at the center, while in the positions L and R the needle bar assembly will be displaced to the left, or to the right, so that the field of operations will be shifted and lateral seams will be produced.

This is due to the fact that turning of knob 13 with shaft 12 will turn the forked arm 94 so that the field adjusting link 11 is displaced and correspondingly displaces the shaft portion 38 of the rocking member 8. Consequently, the position of the zig-zag seam will be shifted, although the amplitude of the zig-zag stitches produced under the control of the pattern cam 3 and of the amplitude adjusting lever 14 will not be influenced. A release lever 7 having an operating portion 108 is mounted on pivot 30 of carrier 5 for turning movement, as best seen in FIGS. 2 and 3. Release lever 7 has a projecting pin 42 cooperating with the arm 109 of cam follower 4. A spring 111 loads release lever 7. When it is desired to replace a pattern cam 3, lever 7 is operated, so that cam follower 4 is retracted from the pattern cam which is thus released, and can be removed. A new pattern cam can be inserted in this position, whereupon lever 7, 108 is released and permits cam follower 4 to assume its normal operative position cooperating with pattern cam 3.

In accordance with the present invention, the machine is provided with a buttonhole device for automatically sewing buttonholes. This device is best seen in FIGS. 1, 2, 5, 9, 12, 14, 15 and 16.

A shaft 43 is turnably mounted on the machine frame 100, and carries a control knob 27 which is secured by a screw 112. As shown in FIG. 24, control knob 27 can be turned between five positions one of which is the "off" position and indicia on a circular indicia plate 116 identify the positions of conrol knob 27. An angular drive member 18 is mounted on shaft 42 and carries a roller 17 on its arm 113. Roller 17 is a cam follower cooperating with a drive cam 16 which is secured to the main drive shaft. The other arm 114 of drive member 18 carries a driving pawl 44 on a pivot pin 45. A spring 46 urges drive pawl 44 to move to a position engaging a ratchet wheel which is fixed to control shaft 43.

When the main drive shaft is rotated with drive cam 16, drive member 18 is angularly reciprocated by the cam follower roller 17 so that the ratchet wheel 19, and thereby control shaft 43, is stepwise driven in one direction. Turning of ratchet wheel 19 in the opposite direction of rotation is prevented by a locking pawl 81 which is supported on a pivot 80 mounted on an arm 115 of the frame bracket 33. A spring 82 abuts arm 115 and locking pawl 81 to urge the same into engagement with the ratchet wheel.

A first control cam 23, best seen in FIGS. 1, 5, 11 and 20, a second control cam 48, best seen in FIGS. 5, 11 and 12, and a third control cam 47, best seen in FIGS. 2, 5 and 23 are fixed to control shaft 43.

The buttonhole control knob 27 turns automatically with shaft 43. When the main drive shaft 1 rotates, drive cam 16 effects stepwise rotation of control shaft 43 by the intermittent drive 16, 17, 18, 44, 19.

When the pointer 70 is moved from the "off" position to position "1" control cam 23 turns with shaft 43, and the cam follower 61 of carrier 5 is engaged by a dwell or lobe 123 of control cam 23 so that carrier 5 moves from the position indicated in chain lines in FIG. 8 to the position shown in solid lines. At the same time, control cam 48 is turned from the position indicated in chain lines in FIG. 9 to the position shown in solid lines so that cam 48 does not cooperate with the end 125 of a feeler arm 25 which is secured by screw 51 to the rocking member 8. Turning of carrier 5 about its axis 30 causes a displacement of the axis 31 of cam follower 4 so that the cam engaging portion 72 is operated by pattern cam 3 to perform large oscillations which are transmitted by the end portions 71 of cam follower 4 to the motion transmitting means 6, 69 by which rocking member 8 and thereby the needle bar assembly are oscillated to perform zig-zag stitches. Consequently, large bar tack stitches 1 will be produced at one end of the buttonhole, as indicated in FIG. 25. During this operation, knob 13 is in a position in which arrow 76 points to the indicia M, and consequently the bar tack stitches 1 are made in a central position of the needle and needle bar assembly. Since rocking member 8 can move freely without being limited by cam 48, the amplitude of the bar tack stitches is the full amplitude produced by the crests and valleys of pattern cam 3.

At the same time, the feed of the fabric is stopped, and the pitch of the stitches suitably adjusted in a manner which will be explained hereinafter, so that the bar tack stitches are made in overlapping positions at the end of the buttonhole slit.

At the completion of the bar tack stitches, shaft 43 is turned to the next position "2" indicated by an indicia on the circular indicator plate 116. In this position of shaft 43, control cam 48 is turned to the position shown in chain lines in FIG. 9, while cam follower 61 of carrier 5 is engaged by the dwell 123, in the same manner as in the preceding position "1," as best seen in the diagrammatic illustration of FIG. 11. Carrier 5 remains in the position shown in solid lines in FIG. 8, and the pivot axis of cam follower 4 remains the same as in the position "1." However, since the turned cam 48 in the chain line position shown in FIG. 9 has its dwell in the region of the engaging portion 25 of rocking means 8, the reciprocating stroke of the rocking means 8 is limited on one side, and stitches "2" having a smaller amplitude are made, as best seen in FIG. 25. The forward feeding speed and the pitch of the stitches are simultaneously adjusted in a manner which will be described hereinafter.

When shaft 43 is further rotated, knob 27 assumes the position "3" in which cams 23 and 48 are in the same positions as in the position "1" so that bar tack switches "3" of large amplitude are produced.

In the following position "4" of shaft 43 and knob 27, cam follower 61 of carrier 5 is located opposite a valley 124 of control cam 23, as best seen in FIG. 11 and FIG. 20. Consequently, carrier 5 assumes the position shown in chain lines in FIG. 8 whereby the axis of cam follower 4 is displaced. When cam follower 4 is oscillated in this position, a corresponding motion is transmitted to the needle bar assembly through transmission means 6, 69, and 9. A stop 151, best seen in FIG. 1 is secured to bracket 33 on frame 100 so that the reciprocating stroke of the motion transmitting rod 6 is limited by engagement of flange 69 with stop 151. In this manner, the amplitude of the reciprocating stroke is limited, and the stitches produced in the position "4" have only substantially half the amplitude of the bar tack stitches which is the amplitude produced by the full height of the peaks and valleys of pattern cam 3.

As best seen in FIG. 11, cam 48 is not effective in the position "4," so that rocking member 8 is free to perform full amplitude stitches which, however, are laterally displaced due to the shifting of the turning axis of cam follower 4 by its displaced carrier 5. However, stop 151 prevents the transmission of full amplitude movements to the needle bar assembly, since it stops the transmission means 6, 69 when the same tend to swing to a position located beyond the right boundary of the stitches 4 illustrated in FIG. 25.

The exact position of carrier 5 is determined by a turnable eccentric stop 24 mounted on a pin 79, as best seen in FIG. 8. Due to the fact that the movement of carrier 5 is limited in this manner, cam follower 61 cannot drop into the valley 124 of cam 23 in the position "4," as will be understood with reference to FIG. 11. The position of carrier 5 can be very accurately adjusted by the eccentric stop 24, and since the position of carrier 5 determines the location of the zig-zag stitches, the position of the left edge of stitches "4" is determined by eccentric stop 24.

As shown in FIG. 11, about 32° are available for the bar tack stitches in the positions "1" and "3," which corresponds to 8 stitches as indicated by the diagram of FIG. 10. A greater angle is available for 47 narrow lateral stitches "2" so that a longer row of stitches may be made as shown in FIG. 10.

It is necessary to reverse the feeding direction during the stitching of the sides of the buttonhole. This is accomplished under the control of control cam 47 which also turns with shaft 43 and is secured to the same by a screw 147. Control cam 47 has five control cam faces 47a, 47b, 47c, 47d and 47e, as best seen in FIG. 23, which successively cooperate with a follower lever 26, best seen in FIGS. 2 and 22. Lever 26 has a feeler portion 126 cooperating with cam 47, and is mounted for angular movement on a pivot pin 56 secured to frame 100. As best seen in FIGS. 1 and 2, a feed adjusting rod 57 is secured to the free end of lever 26 and connected at its lower end to an adjusting link 58 which is coupled with the feed adjusting device 90. The spring 59 is provided between adjusting rod 57 and link 58 which is connected to the feed adjusting device by coupling link 161 and which is also connected with a cam follower fork 62 which embraces a feed drive cam 63 on main drive shaft 1. The fork-shaped cam follower portion is omitted in FIG. 1 for the sake of simplicity. The adjustment of the feeding speed by the feed control device is carried out in a conventional manner, and it will be understood that the feed adjusting rod 57 will set the feeding device to different conditions, when shifted by feeler lever 26 under the control of feed control cam 47.

When shaft 43 and knob 27 are in the position "1,"

cam portion 47a of control cam 47 cooperates with feeler lever 26 to adjust the feeding device to a position in which the fabric is not fed, so that the bar tack stitches 1 are closely adjacent or superimposed. In the following position "2," cam portion 47b is effective to adjust the position of rod 47 for setting the feed adjusting device 90 to the position in which the fabric moves forward so that the half amplitude stitches 2 in FIG. 25 are produced in a row on the side of the buttonhole slit.

When the shaft 43 is further turned, feeler lever 26 is raised slightly by cam portion 47c to produce bar tack stitches 3, and when cam 47 is further turned, cam portion 47d is effective to raise the feed adjusting rod 57 so that the feeding direction is automatically reversed for making stitches 4 on the right side of the buttonhole.

The pitch of the buttonhole stitches is adjusted in a conventional manner by the feed adjusting dial 150 by setting the same to the indicia 118 as shown in FIG. 24. The stitching thus produced has a pitch of about 0.4 mm.

In the position of the device shown in FIG. 14, the automatic intermittent drive of shaft 43 is operative in the position shown in FIG. 15, the automatic drive is interrupted.

The member 127 has a pivot 52 on which a shift arm 22 is mounted for angular movement. Shift arm 22 is shown in FIG. 18 to include a hub 129, a locking shoulder 138, and an inclined guide face 139. A spring 53 abuts member 127 and part 139 of shifting arm 22 to urge shifting arm 22 to turn in clockwise direction.

A shifting lever 21 has a hub portion 128 mounted for turning movement on shaft 43. As best seen in FIG. 17 shifting lever 21 has two projecting pins 54 and 149, and as best seen in FIG. 5, shifting lever 21 projects through an opening 156 in a frame wall 100 to the outside so that its handle portion is located in the region of knob 27, as also shown in FIG. 24.

A spring 55 abuts an arm 113 of the angular drive member 18 and shifting lever 21 to urge the same to turn in clockwise direction so that the projecting pin 54 is pressed against the locking shoulder 138 of shifting arm 22 in the position of FIG. 14. In this position, the angular drive member 18 is driven by cam 16 which cooperates with the follower pin 17 on arm 113 of drive member 18.

Ratchet wheel 19 has a projecting pin 60 which during rotation of ratchet wheel 19 moves to a position engaging the inclined guide face 139 of shifting arm 22 to turn the same until the locking shoulder 138 releases pin 54 permitting shifting arm 22 and shifting lever 21 to turn under the action of the corresponding springs 53 and 55. In this manner, the spring pressure on arm 113 of drive member 18 is relieved, and the follower pin is no longer engaged and operated by the drive cam 16 so that the intermittent drive is stopped. Termination of the rotation of the control shaft 43 takes place after 8 stitches "4" on the right side of the buttonhole, as shown in FIG. 10. The setting of the buttonhole stitching device regarding stitch amplitude, feeding direction and feeding speed remains the same while the row of stitches on the right side is made. The operator stops the machine when the needle reaches the first bar tack stitches 7 shown in FIG. 25.

The device is further improved by the provision of a stop lever 20 whose shape is best seen in FIG. 13. Stop lever 20 is turnably mounted on shaft 43, and has a portion 40 attached by screws 38 to a corresponding portion of shifting lever 21, as best seen in FIG. 5. A projection 141 of stop lever 20 projects laterally of the shifting lever 21 and cooperates with the end portion 22a of shifting arm 22, as best seen in FIG. 15. When shifting lever 21 is released and stops, stop lever 20 turns therewith so that its projection 141 presses the end portion 22a of shifting arm 22 down, whereby driving member 18 is turned in clockwise direction, so that follower pin 17 is held in a position spaced from drive cam 16.

Stop lever 20 has two projecting portions 142 and 143, as best seen in FIG. 13, and when stop lever 20 is turned in clockwise direction, projections 142 and 143 respectively engage driving pawl 44 and locking pawl 81 to push the same to a position releasing ratchet wheel 19 so that the same cannot be driven. Consequently, the intermittent drive of shaft 43 is completely disconnected. In order to start the intermittent drive again, shifting lever 21 is turned in counterclockwise direction by the operator whereby the initial operative position of the parts shown in FIG. 14 is reestablished, and the springs 53 and 55 tensioned.

By operation of the shifting lever 21, the operator determines whether the successive buttonhole stitching positions are automatically assumed by the device, or whether the shaft 43 is to be stopped in one position, so that, for example, the stitches 2 or 4 can be produced in any desired number.

In addition to the automatic operation of the buttonhole stitching device, it is also possible to control the device by manual operation.

As best seen in FIG. 16 and FIG. 5, a stop member 83 is secured to shaft 43 and has notches 83a, 83b, 83c, 83d and 83e. A mounting bracket 153 is provided in the region of stop member 83 and supports a pivot pin 86 on which a bevel armed pawl 85 is mounted. A spring 87 abuts a projection 145 on pawl 85 and has another end hooked into a hole in the mounting plate 153 so that pawl 85 is spring-loaded. The arm 146 of pawl 85 is urged into contact with any one of the notches by spring 87. The position of pawl 85 shown in solid lines in FIG. 16 corresponds to the automatic intermittent operation of the buttonhole devices, while in the position shown in solid lines in FIG. 16, the buttonhole stitching is controlled by a manual operation.

In the position of FIG. 14, in which the automatic drive is operative, the projecting pin 149 on shifting lever 21, see FIG. 17, presses against arm 145 to release the locking arm 146 of pawl 85 from engagement with stop member 83.

When the automatic drive is stopped in the position of the device shown in FIG. 15, projection 149 releases portion 145 of pawl 85, and the locking arm 146 engages one of the notches of stop member 83. When knob 27 is manually turned, shaft 43 also turns from the "off" position to the four successive buttonhole stitching positions, and is stopped in each operative position by locking portion 146 snapping into one of the notches of stop member 83 which turns with shaft 43.

In this manner, buttonholes can be stitched either by an automatic operation, or by a manual operation. The two conditions of the machine are obtained by operating the shifting lever 22.

It will be understood that each of the elements described above, or two or more together, may also find a useful application in other types of buttonhole stitching devices differing from the types described above.

While the invention has been illustrated and described as embodied in an automatically operated buttonhole stitching device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A buttonhole stitching apparatus for a sewing machine, comprising, in combination, a main drive shaft;

needle means; transmission means connecting said main drive shaft with said needle means for moving said needle means in a lateral oscillating movement so as to make zig-zag stitches, said transmission means including adjustable means movable between a plurality of positions for varying the amplitude of the zig-zag stitches, said adjustable means including cam follower means; feed adjusting means having a plurality of positions for varying the speed at which a fabric is fed to said needle means, said feed adjusting means including other cam follower means; control shaft means having cam means cooperating with said cam follower means and other cam means cooperating with said other cam follower means, said control shaft means being turnable between a plurality of positions for simultaneously shifting said adjustable means and said feed adjusting means between said positions of the same in such a manner that zig-zag stitches of greater amplitude are made at a minimum feeding speed and zig-zag stitches of smaller amplitude are made at a selected feeding speed; and intermittently operating drive means connecting said main drive shaft with said control shaft means for stepwise turning the latter between said positions so that said needle means makes bar tack stitches of greater amplitude at the ends, and rows of smaller stitches along the sides of a buttonhole, said drive means including a drive cam on said main drive shaft, a drive member mounted for angular movement on said control shaft means and having a follower cooperating with said drive cam, pawl means mounted on said drive member, and ratchet wheel means secured to said control shaft and being stepwise turned by said pawl means.

2. A buttonhole stitching apparatus for a sewing machine, comprising, in combination, a main drive shaft; a pattern cam driven from said main drive shaft; a carrier shiftable between two positions; a cam follower mounted on said carrier for angular movement about an axis and having a first end portion cooperating with said pattern cam; needle means; transmission means connected to said needle means and including a transmission member engaged by the second end portion of said cam follower so that said needle means is laterally oscillated to make zig-zag stitches, said transmission means including a rocking means; control shaft means including a first control cam and a second control cam, and being turnable between a plurality of positions, said first control cam cooperating with said carrier to shift the same between said positions thereof whereby said axis of said cam follower is displaced, and said second control cam cooperating with said rocking means to limit the stroke of the same whereby stitches of smaller aplitude are made; drive means including a transmission means connecting said main drive shaft to said control shaft for automatically moving the same between said positions so that said needle means makes zig-zag stitches of different amplitude.

3. A buttonhole stitching apparatus for a sewing machine, comprising, in combination, a main drive shaft; a pattern cam driven from said main drive shaft; a carrier shiftable between two positions; a cam follower mounted on said carrier for angular movement about an axis and having a first end portion cooperating with said pattern cam; needle means; transmission means connected to said needle means and including a transmission member engaged by the second end portion of said cam follower so that said needle means is laterally oscillated to make zig-zag stitches, said transmission means including a rocking means; feed adjusting means having a plurality of positions for varying the speed at which a fabric is fed to said needle means; control shaft means including a first control cam, a second control cam, and a third control cam, and being turnable between a plurality of positions, said first control cam cooperating with said carrier to shift the same between said positions thereof whereby said axis of said cam follower is displaced, said second control cam cooperating with said rocking means to limit the stroke of the same whereby stitches of smaller amplitude are made, and said third control cam being operatively connected to said feed adjusting means for setting the same to a minimum speed when stitches of greater amplitude are made, and for setting the same to a selected speed when stitches of smaller amplitude are made; drive means including a transmission means connecting said main drive shaft to said control shaft for automatically moving the same between said positions so that said needle means makes zig-zag stitches of different amplitude.

4. A buttonhole stitching apparatus for a sewing machine, comprising, in combination, a main drive shaft; a pattern cam driven from said main drive shaft; a carrier shiftable between two positions; a cam follower mounted on said carrier for angular movement about an axis and having a first end portion cooperating with said pattern cam; needle means; transmission means connected to said needle means and including a transmission member engaged by the second end portion of said cam follower so that said needle means is laterally oscillated to make zig-zag stitches, said transmission means including a rocking means; feed adjusting means having a plurality of positions for varying the speed at which a fabric is fed to said needle means; control shaft means including a first control cam, a second control cam, and a third control cam, and being turnable between a plurality of positions, said first control cam cooperating with said carrier to shift the same between said positions thereof whereby said axis of said cam follower is displaced, said second control cam cooperating with said rocking means to limit the stroke of the same whereby stitches of smaller amplitude are made, and said third control cam being operatively connected to said feed adjusting means for setting the same to a minimum speed when stitches of greater amplitude are made, and for setting the same to a selected speed when stitches of smaller amplitude are made; drive means including a transmission means connecting said main drive shaft to said control shaft for automatically moving the same between said positions so that said needle means makes zig-zag stitches of different amplitude, said transmission means including manually disengageable coupling means connecting said control shaft with said main drive shaft.

5. A buttonhole stitching apparatus for a sewing machine, comprising, in combination, an oscillatory needle support for effecting a zig-zag stitch of a needle supported thereon; operating means for oscillating said needle support and having a first position for effecting a small stitch on one side of a buttonhole and a second position for effecting a wide stitch across the ends of the buttonhole; stop means movable between an inoperative position, and an operative position for limiting movement of said needle support; control means operatively connected to said operating means and to said stop means and having a first control position for holding the latter in said inoperative position while said operating means is in said first position, and having second and third control positions for holding said stop means selectively in said inoperative and operative positions while said operating means is in said second position for respectively effecting said wide stitch and a small stitch on the other side of the buttonhole displaced relative to said first-mentioned small stitch; and drive means connected to said control means for moving the same sequentially between said control positions so that the same automatically actuates said operating means and said stop means.

6. A buttonhole stitching apparatus for a sewing machine, comprising, in combination, a main drive shaft; an oscillatory needle support for effecting a zig-zag stitch of a needle suported thereon; operating means for oscillating said needle support and having a first position for effecting a small stitch on one side of a buttonhole and a second position for effecting a wide stitch across the ends of the buttonhole; stop means movable between an inoperative position, and an operative position for limiting movement of said needle support; control means operatively connected to said operating means and to said stop means and having a first control position for holding the latter in said inoperative position while said operating means is in said first position, and having second and third control positions for holding said stop means selectively in said inoperative and operative positions while said operating means is in said second position for respectively effecting said wide stitch and a small stitch on the other side of the buttonhole displaced relative to said first-mentioned small stitch; and transmission means driven from said main drive shaft and connected to said control means for moving the same sequentially between said control positions so that the same automatically actuates said operating means and said stop means.

7. A buttonhole stitching aparatus for a sewing machine, comprising, in combination, a main drive shaft; an oscillatory needle support for effecting a zig-zag stitch of a needle supported thereon; operating means for oscillating said needle support and having a first position for effecting a small stitch on one side of a buttonhole and a second position for effecting a wide stitch across the ends of the buttonhole; stop means movable between an inoperative position, and an operative position for limiting movement of said needle support; control means operatively connected to said operating means and to said stop means and having a first control position for holding the latter in said inoperative position while said operating means is in said first position, and having second and third control positions for holding said stop means selectively in said inoperative and operative positions while said operating means is in said second position for respectively effecting said wide stitch and a small stitch on the other side of the buttonhole displaced relative to said first-mentioned small stitch; and transmission means driven from said main drive shaft and connected to said control means for moving the same sequentially between said control positions so that the same automatically actuates said operating means and said stop means, said transmission means including means for transforming the continuous rotation of said main drive shaft into an intermittent stepwise movement.

8. A buttonhole stitching apparatus set forth in claim 6 and including feed adjusting means controlled by said control means in said second position to cause a lower feeding speed when wide stitches are made, and controlled by said control means in said second control position to cause a higher feeding speed when small stitches are made.

References Cited by the Examiner
UNITED STATES PATENTS

| | | | |
|---|---|---|---|
| 2,929,344 | 3/1960 | Theenhausen et al. | 112—158 |
| 2,972,319 | 2/1961 | Moro | 112—158 |
| 3,041,988 | 7/1962 | Fujita | 112—158 |
| 3,043,253 | 7/1962 | Wank et al. | 112—158 |
| 3,076,066 | 1/1963 | Caron | 112—158 |
| 3,083,657 | 4/1963 | Theenhausen et al. | 112—158 |
| 3,090,334 | 5/1963 | Hayashi et al. | 112—158 |

FRANK J. COHEN, *Primary Examiner.*

ROBERT V. SLOAN, JORDAN FRANKLIN, *Examiners.*

R. J. SCANLAN, *Assistant Examiner.*